(12) United States Patent
Lee et al.

(10) Patent No.: US 10,917,226 B2
(45) Date of Patent: Feb. 9, 2021

(54) TECHNIQUES AND APPARATUSES FOR TIME DIVISION MULTIPLEXING FOR DUAL-RAT COMMUNICATION

(71) Applicant: QUALCOMM Incorporated, San Diego, CA (US)

(72) Inventors: Heechoon Lee, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 16/155,583

(22) Filed: Oct. 9, 2018

(65) Prior Publication Data

US 2019/0109697 A1 Apr. 11, 2019

Related U.S. Application Data

(60) Provisional application No. 62/571,176, filed on Oct. 11, 2017.

(51) Int. Cl.
| | |
|---|---|
| *H04L 5/14* | (2006.01) |
| *H04L 1/18* | (2006.01) |
| *H04W 72/04* | (2009.01) |
| *H04W 72/12* | (2009.01) |
| *H04L 5/00* | (2006.01) |

(52) U.S. Cl.
CPC .......... *H04L 5/1469* (2013.01); *H04L 1/1812* (2013.01); *H04L 5/0007* (2013.01); *H04L 5/1438* (2013.01); *H04W 72/0446* (2013.01); *H04W 72/1215* (2013.01); *H04L 5/0055* (2013.01)

(58) Field of Classification Search
CPC ... H04L 5/1469; H04L 5/0007; H04L 5/1438; H04L 1/1812; H04W 72/0446; H04W 72/1215
See application file for complete search history.

(56) References Cited

U.S. PATENT DOCUMENTS

2013/0034028 A1* 2/2013 Chen ............... H04L 1/1861
370/280
2019/0357264 A1* 11/2019 Yi .................. H04W 74/008

OTHER PUBLICATIONS

3GPP; 3GPP TSG RAN WG1 Meeting NR#3; 2017 (Year: 2017).*

(Continued)

*Primary Examiner* — Ricky Q Ngo
*Assistant Examiner* — Stephen N Steiner
(74) *Attorney, Agent, or Firm* — Harrity & Harrity, LLP

(57) ABSTRACT

Certain aspects of the present disclosure generally relate to wireless communication. In some aspects, a user equipment (UE) may receive scheduling information for a transmission associated with a particular radio access technology (RAT) of a 4G RAT or a 5G RAT, wherein the scheduling information identifies a particular resource of one of a first set of resources for the 4G RAT or a second set of resources for the 5G RAT, wherein one or more resources of the first set of resources are guaranteed for the 4G RAT based at least in part on a reference 4G time division duplexing (TDD) configuration, and wherein the one or more resources of the first set of resources and the second set of resources do not overlap in a time domain; and transmit or receive the transmission using the particular resource. Numerous other aspects are provided.

64 Claims, 12 Drawing Sheets

(56) References Cited

OTHER PUBLICATIONS

Apple Inc: "On UE TDM Uplink Transmission in NR NSA Mode", 3GPP Draft; R1-1714089 on UE TDM Uplink Transmission in NR NSA Mode, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017, XP051316879, Retrieved from the Internet: URL:http://www.3gpp.org/ftp/Meetings_3GPP_SYNC/RAN1/Docs/ [retrieved on Aug. 20, 2017], 7 pages.
Huawei et al., "Discussion on the Remaining Issues of LTE-NR DC and UL Coexistence", 3GPP Draft; R1-1715429, 3rd Generation Partnership Project (3GPP), Mobile Competence Centre; 650, Route Des Lucioles; F-06921 Sophia-Antipolis Cedex; France, vol. RAN WG1, No. Nagoya. Japan; Sep. 18, 2017-Sep. 21, 2017 Sep. 17, 2017, XP051338897, Retrieved from the Internet: URL:http://www.3gpp.org/ftp/Meetings_3GPP_SYNC/RAN1/Docs/ [retrieved on Sep. 17, 2017], 13 pages.
International Search Report and Written Opinion—PCT/US2018/055194—ISA/EPO—dated Dec. 13, 2018.
ZTE: "Discussion on Coordination between LTE and NR for LTE-NR Co-existence", 3GPP Draft; R3-173695 Discussion on Coordination between LTE and NR for LTE-NR Co-existence, 3rd Generation Partnership Project (3GPP), Mobile Competence Centre; 650, Route Des Lucioles; F-06921 Sophia-Antipolis Cedex; France, vol. RAN WG3, No. Prague, Czech; Oct. 9, 2017-Ot. 13, 2017 Oct. 9, 2017, XP051344121, Retrieved from the Internet: URL:http://www.3gpp.org/ftp/Meetings_3GPP_SYNC/RAN3/Docs/ [retrieved on Oct. 9, 2017], 7 pages.

* cited by examiner

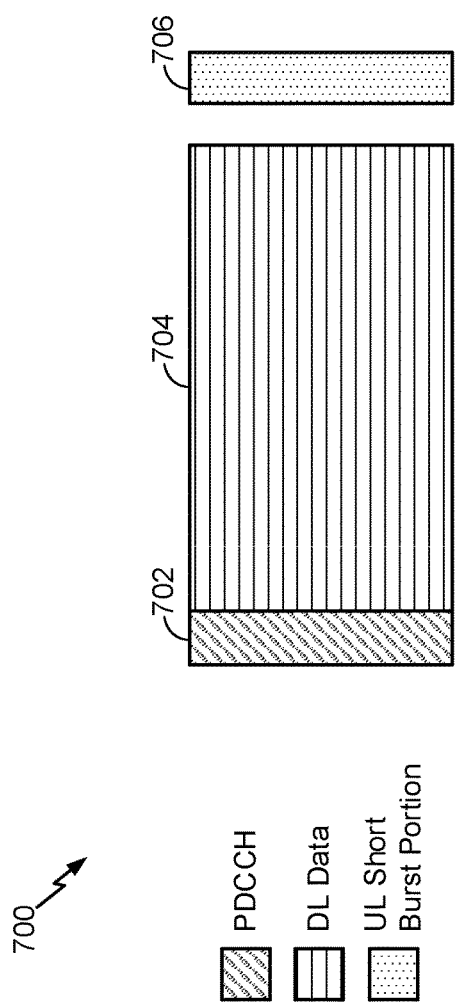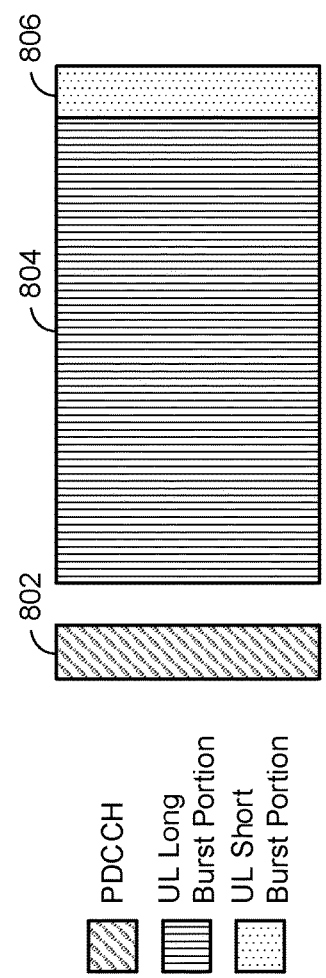
FIG. 7
FIG. 8

TECHNIQUES AND APPARATUSES FOR TIME DIVISION MULTIPLEXING FOR DUAL-RAT COMMUNICATION

CROSS-REFERENCE TO RELATED APPLICATIONS UNDER 35 U.S.C. § 119

This application claims priority to Provisional Patent Application No. 62/571,176, filed on Oct. 11, 2017, entitled "TECHNIQUES AND APPARATUSES FOR TIME DIVISION MULTIPLEXING FOR DUAL-RAT COMMUNICATION" which is hereby expressly incorporated by reference herein.

FIELD OF THE DISCLOSURE

Aspects of the present disclosure generally relate to wireless communication, and more particularly to techniques and apparatuses for time division multiplexing (TDM) for dual radio access technology (RAT) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) configured for uplink sharing for a first radio access technology (RAT) and a second RAT may include receiving scheduling information for a communication associated with a particular RAT of the first RAT or the second RAT, wherein the scheduling information identifies a particular resource of one of a first set of resources for the first RAT or a second set of resources for the second RAT, wherein one or more resources of the first set of resources are guaranteed for the first RAT based at least in part on a reference first time division duplexing (TDD) configuration, and wherein the one or more resources of the first set of resources and the second set of resources do not overlap in a time domain; and transmitting the communication using the particular resource.

In some aspects, a UE for wireless communication configured for uplink sharing for a first RAT and a second RAT may include memory and one or more processors operatively coupled to the memory. The memory and the one or more processors may be configured to receive scheduling information for a communication associated with a particular RAT of the first RAT or the second RAT, wherein the scheduling information identifies a particular resource of one of a first set of resources for the first RAT or a second set of resources for the second RAT, and wherein the first set of resources and the second set of resources do not overlap in a time domain, wherein one or more resources of the first set of resources are guaranteed for the first RAT based at least in part on a reference first TDD configuration, and wherein the one or more resources of the first set of resources and the second set of resources do not overlap in a time domain; and transmit the communication using the particular resource.

In some aspects, a non-transitory computer-readable medium may store one or more instructions for wireless communication. The one or more instructions, when executed by one or more processors of a UE configured for uplink sharing for a first RAT and a second RAT, may cause the one or more processors to receive scheduling information for a communication associated with a particular RAT of the first RAT or the second RAT, wherein the scheduling information identifies a particular resource of one of a first set of resources for the first RAT or a second set of resources for the second RAT, wherein one or more resources of the first set of resources are guaranteed for the first RAT based at least in part on a reference first TDD configuration, and wherein the one or more resources of the first set of resources and the second set of resources do not overlap in a time domain; and transmit the communication using the particular resource.

In some aspects, an apparatus for wireless communication may include means for receiving scheduling information for a communication associated with a particular RAT of a first RAT or a second RAT, wherein the scheduling information identifies a particular resource of one of a first set of resources for the first RAT or a second set of resources for the second RAT, wherein one or more resources of the first set of resources are guaranteed for the first RAT based at least in part on a reference first TDD configuration, and wherein the one or more resources of the first set of resources and the second set of resources do not overlap in a time domain; and means for transmitting the communication using the particular resource.

In some aspects, a method of wireless communication performed by a base station may include transmitting scheduling information to a user equipment (UE) for a communication associated with a particular radio access technology (RAT) of a first RAT or a second RAT, wherein the scheduling information identifies a particular resource of one of a first set of resources for the first RAT or a second set of resources for the second RAT, and wherein the first set of resources and the second set of resources do not overlap in a time domain, wherein one or more resources of the first set of resources are guaranteed for the first RAT based at least in part on a reference first time division duplexing (TDD) configuration, and wherein the one or more resources of the first set of resources and the second set of resources do not overlap in a time domain; and receiving the communication using the particular resource.

In some aspects, a base station for wireless communication may include memory and one or more processors operatively coupled to the memory. The memory and the one or more processors may be configured to transmit scheduling information to a user equipment (UE) for a communication associated with a particular radio access technology (RAT) of a first RAT or a second RAT, wherein the scheduling information identifies a particular resource of one of a first set of resources for the first RAT or a second set of resources for the second RAT, wherein one or more resources of the first set of resources are guaranteed for the first RAT based at least in part on a reference first time division duplexing (TDD) configuration, and wherein the one or more resources of the first set of resources and the second set of resources do not overlap in a time domain; and receive the communication using the particular resource.

In some aspects, a non-transitory computer-readable medium may store one or more instructions for wireless communication. The one or more instructions, when executed by one or more processors of a base station, may cause the one or more processors to transmit scheduling information to a user equipment (UE) for a communication associated with a particular radio access technology (RAT) of a first RAT or a second RAT, wherein the scheduling information identifies a particular resource of one of a first set of resources for the first RAT or a second set of resources for the second RAT, wherein one or more resources of the first set of resources are guaranteed for the first RAT based at least in part on a reference first time division duplexing (TDD) configuration, and wherein the one or more resources of the first set of resources and the second set of resources do not overlap in a time domain; and receive the communication using the particular resource.

In some aspects, an apparatus for wireless communication may include means for transmitting scheduling information to a user equipment (UE) for a communication associated with a particular radio access technology (RAT) of a first RAT or a second RAT, wherein the scheduling information identifies a particular resource of one of a first set of resources for the first RAT or a second set of resources for the second RAT, wherein one or more resources of the first set of resources are guaranteed for the first RAT based at least in part on a reference first time division duplexing (TDD) configuration, and wherein the one or more resources of the first set of resources and the second set of resources do not overlap in a time domain; and means for receiving the communication using the particular resource.

Aspects generally include a method, apparatus, system, computer program product, non-transitory computer-readable medium, base station, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with certain aspects of the present disclosure.

FIG. 8 is a diagram illustrating an example of an uplink (UL)-centric subframe, in accordance with certain aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
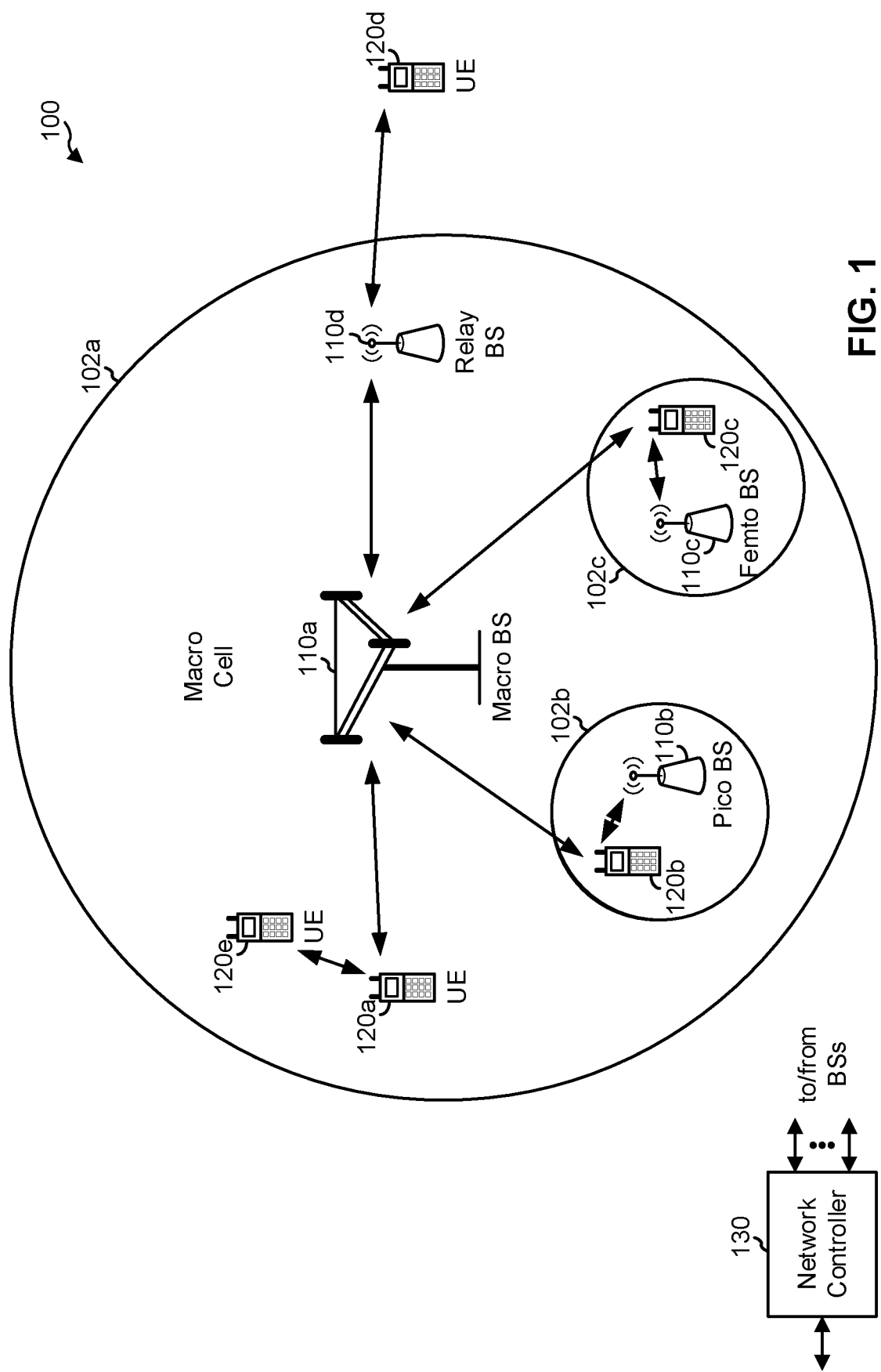
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
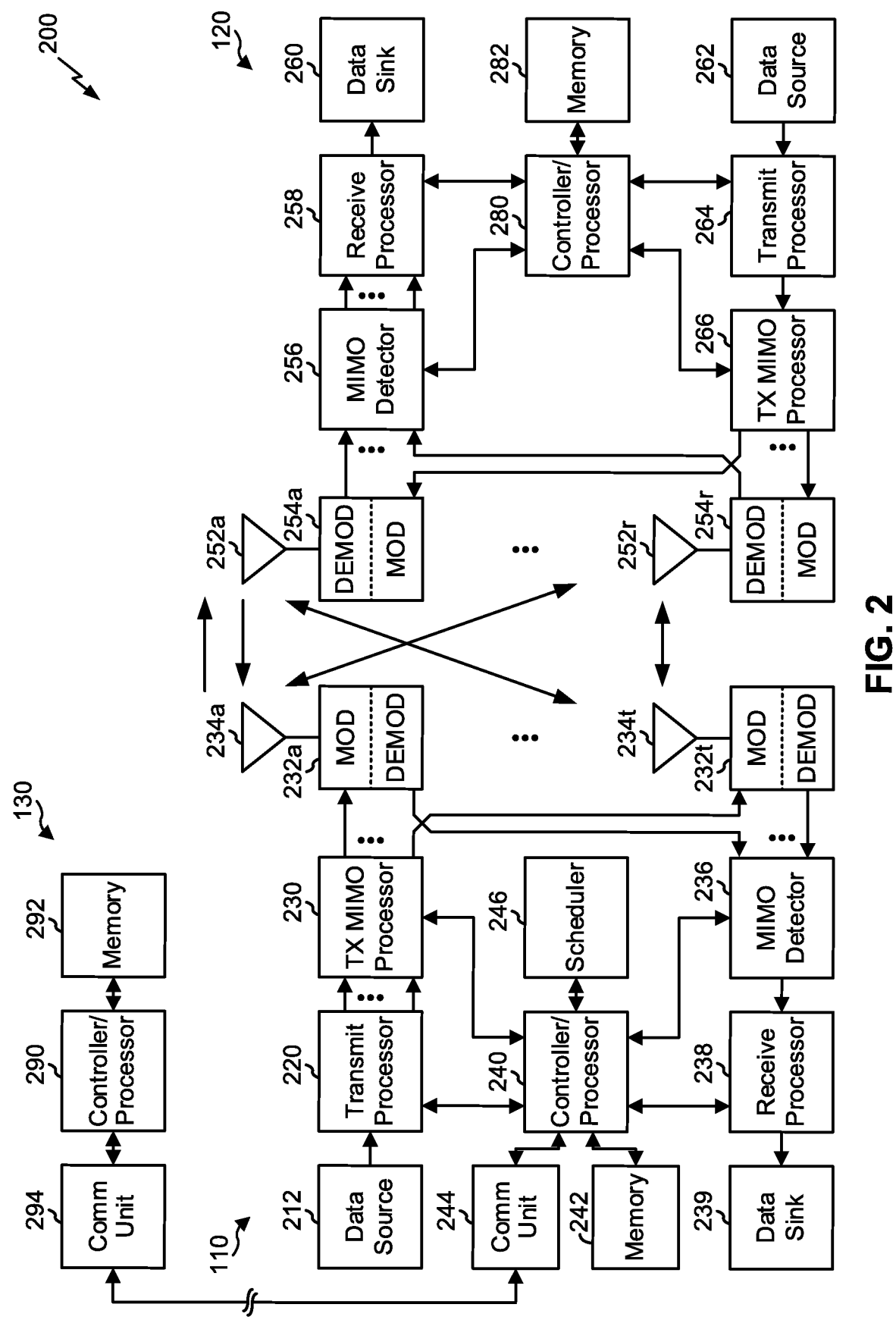
FIG. 2 is a block diagram conceptually illustrating an example of a base station in communication with a user equipment (UE) in a wireless communication network, in accordance with various aspects of the present disclosure.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with TDM for dual-RAT communication, as described in more detail elsewhere herein. For example, controller/processor 240 of BS 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for receiving scheduling information for a communication associated with a particular RAT of a first RAT or a second RAT, wherein the scheduling information identifies a particular resource of one of a first set of resources for the first RAT or a second set of resources for the second RAT, wherein one or more resources of the first set of resources are guaranteed for the first RAT based at least in part on a reference first TDD configuration of the UE, wherein the one or more resources of the first set of resources and the second set of resources do not overlap in a time domain; means for transmitting the communication using the particular resource; means for receiving downlink data of the downlink HARQ communication in any resource of the first set of resources; means for receiving downlink data for the downlink HARQ communication in a resource identified by the reference first TDD configuration; and/or the like. In some aspects, such means may include one or more components of UE 120 described in connection with FIG. 2.

In some aspects, BS 110 may include means for transmitting scheduling information to a UE for a communication associated with a particular radio access technology (RAT) of a first RAT or a second RAT, wherein the scheduling information identifies a particular resource of one of a first set of resources for the first RAT or a second set of resources for the second RAT, wherein one or more resources of the first set of resources are guaranteed for the first RAT based at least in part on a reference first time division duplexing (TDD) configuration, wherein the one or more resources of the first set of resources and the second set of resources do not overlap in a time domain; means for receiving the communication using the particular resource; means for transmitting downlink data of the downlink HARQ communication in any resource of the first set of resources; means for transmitting downlink data for the downlink HARQ communication in a resource identified by the reference first TDD configuration; and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3A:
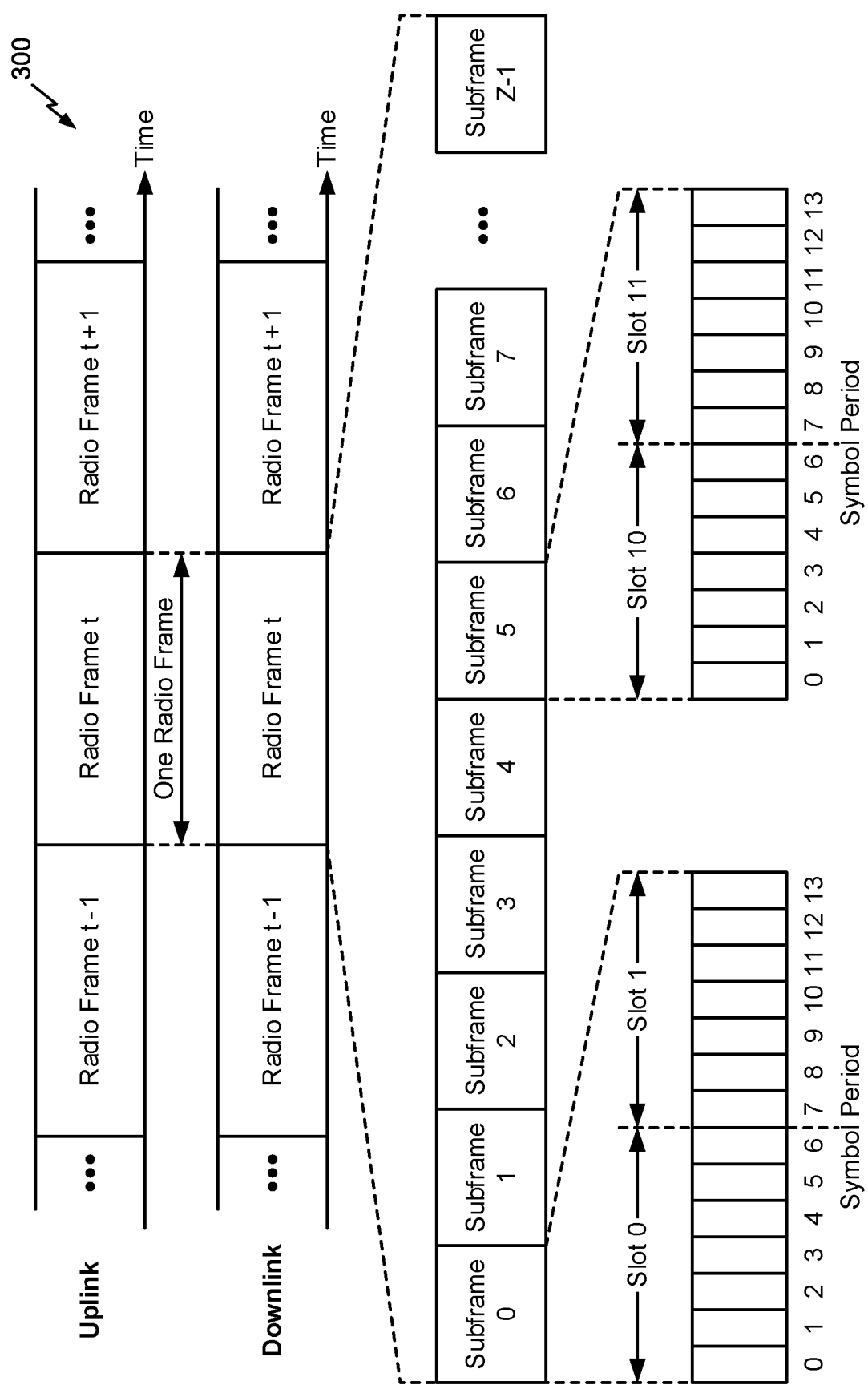
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a radio access technology (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a BS may transmit synchronization signals. For example, a BS may transmit a primary synchronization signal (PSS), a secondary synchronization signal (SSS), and/or the like, on the downlink for each cell supported by the BS. The PSS and SSS may be used by UEs for cell search and acquisition. For example, the PSS may be used by UEs to determine symbol timing, and the SSS may be used by UEs to determine a physical cell identifier, associated with the BS, and frame timing. The BS may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
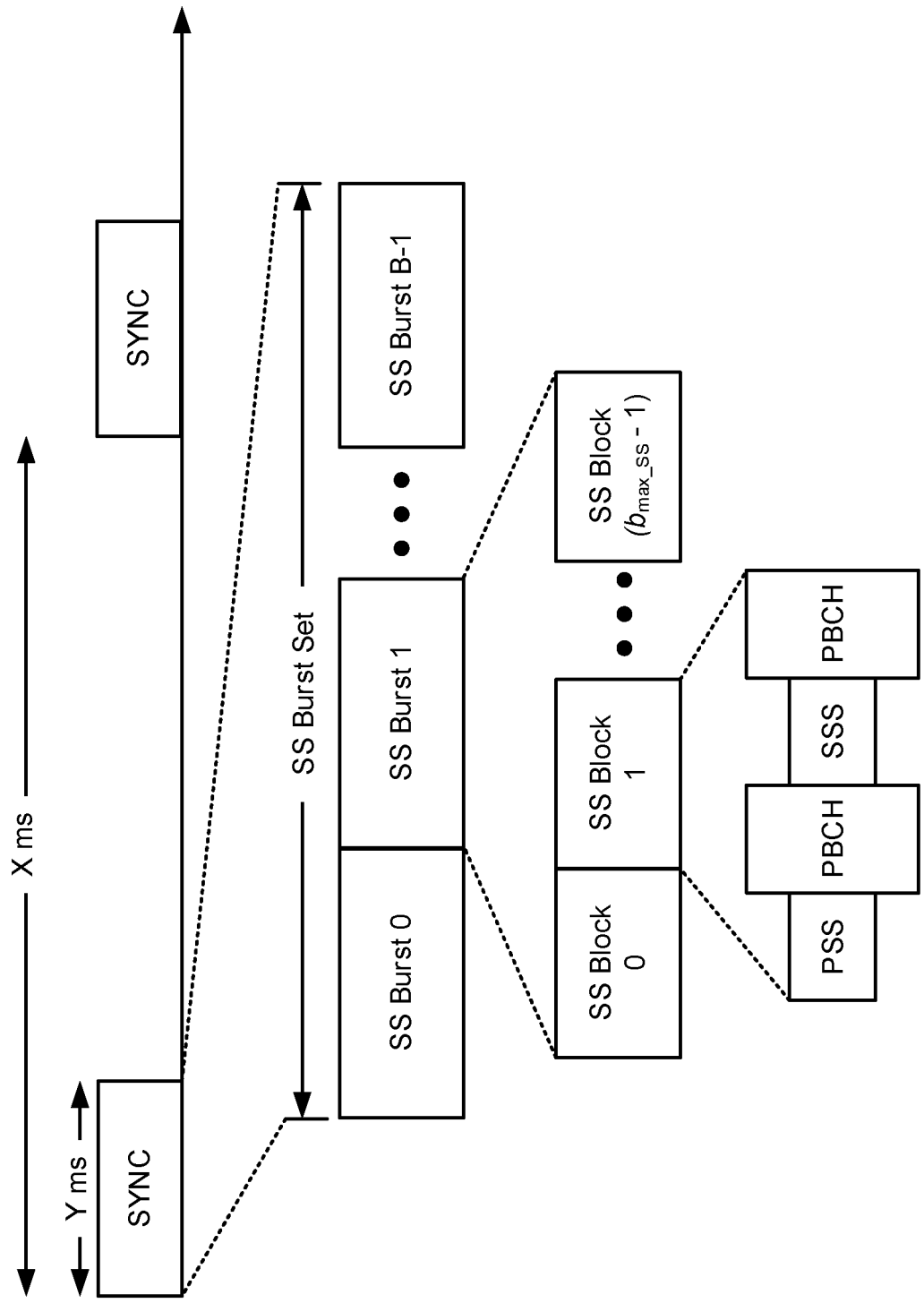
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst. In some aspects, the SS burst set may have a burst set periodicity, whereby the SS bursts of the SS burst set are transmitted by the BS according to the fixed burst set periodicity. In other words, the SS bursts may be repeated during each SS burst set.

The BS may transmit system information, such as system information blocks (SIBs) on a physical downlink shared channel (PDSCH) in certain subframes. The BS may transmit control information/data on a physical downlink control channel (PDCCH) in Q symbol periods of a subframe, where Q may be configurable for each subframe. The BS may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
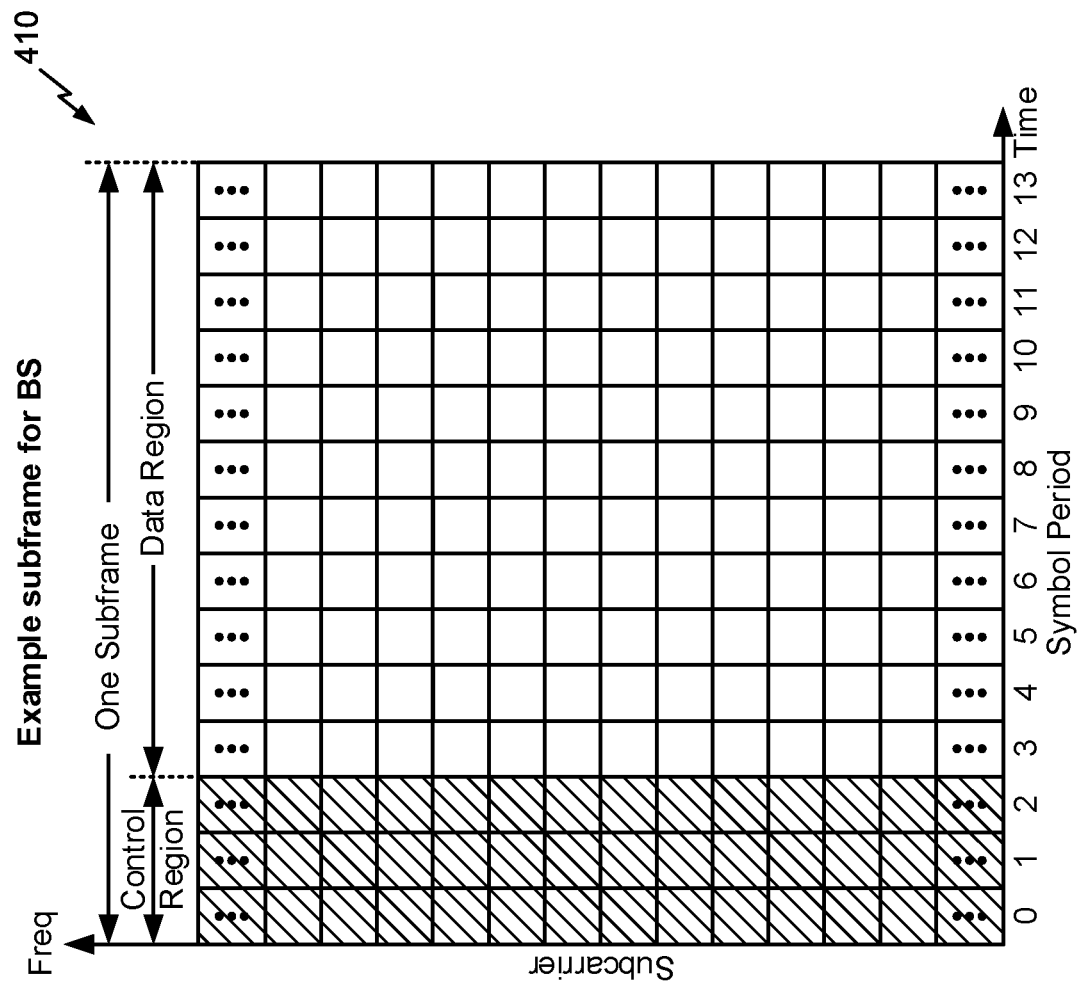
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
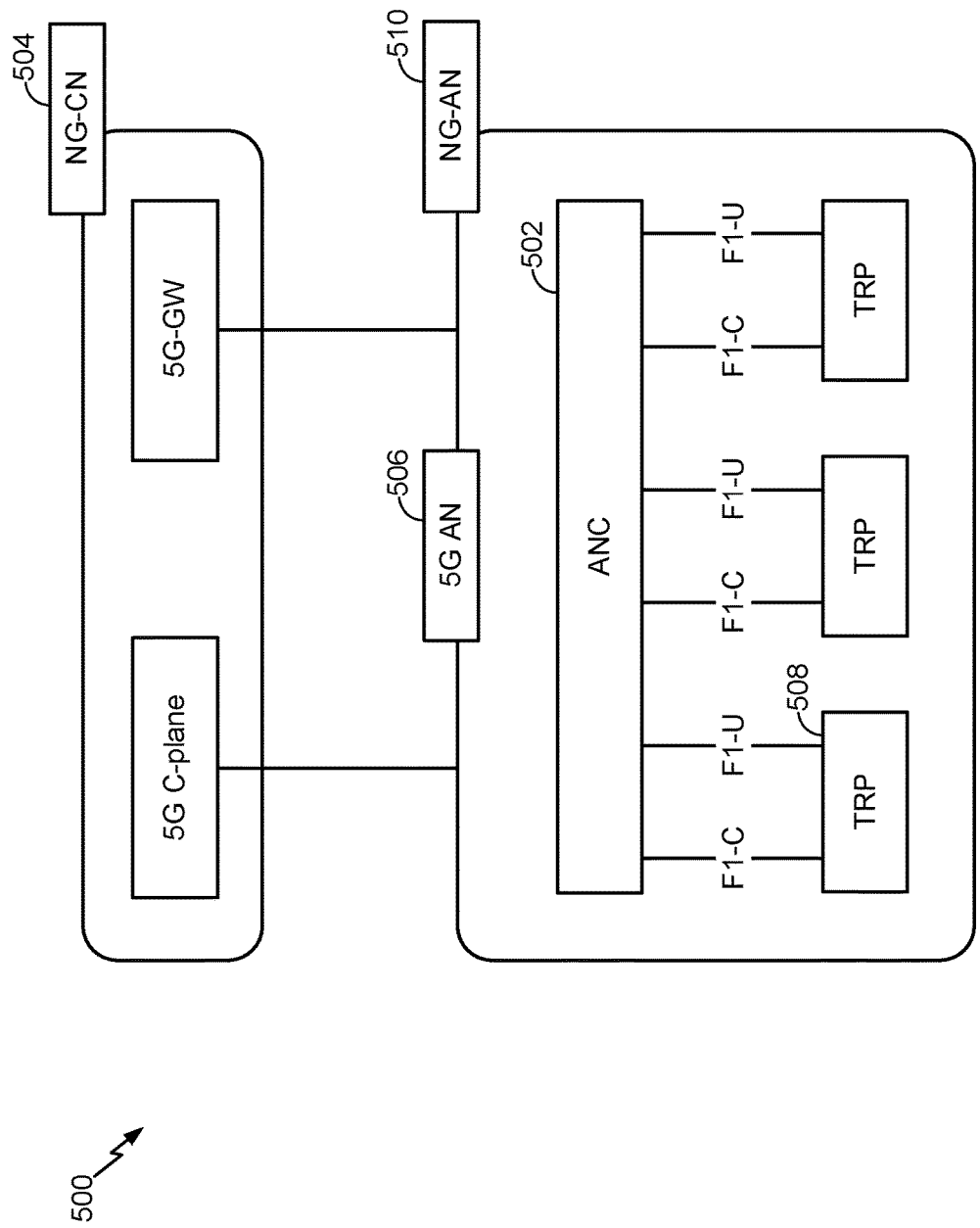
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
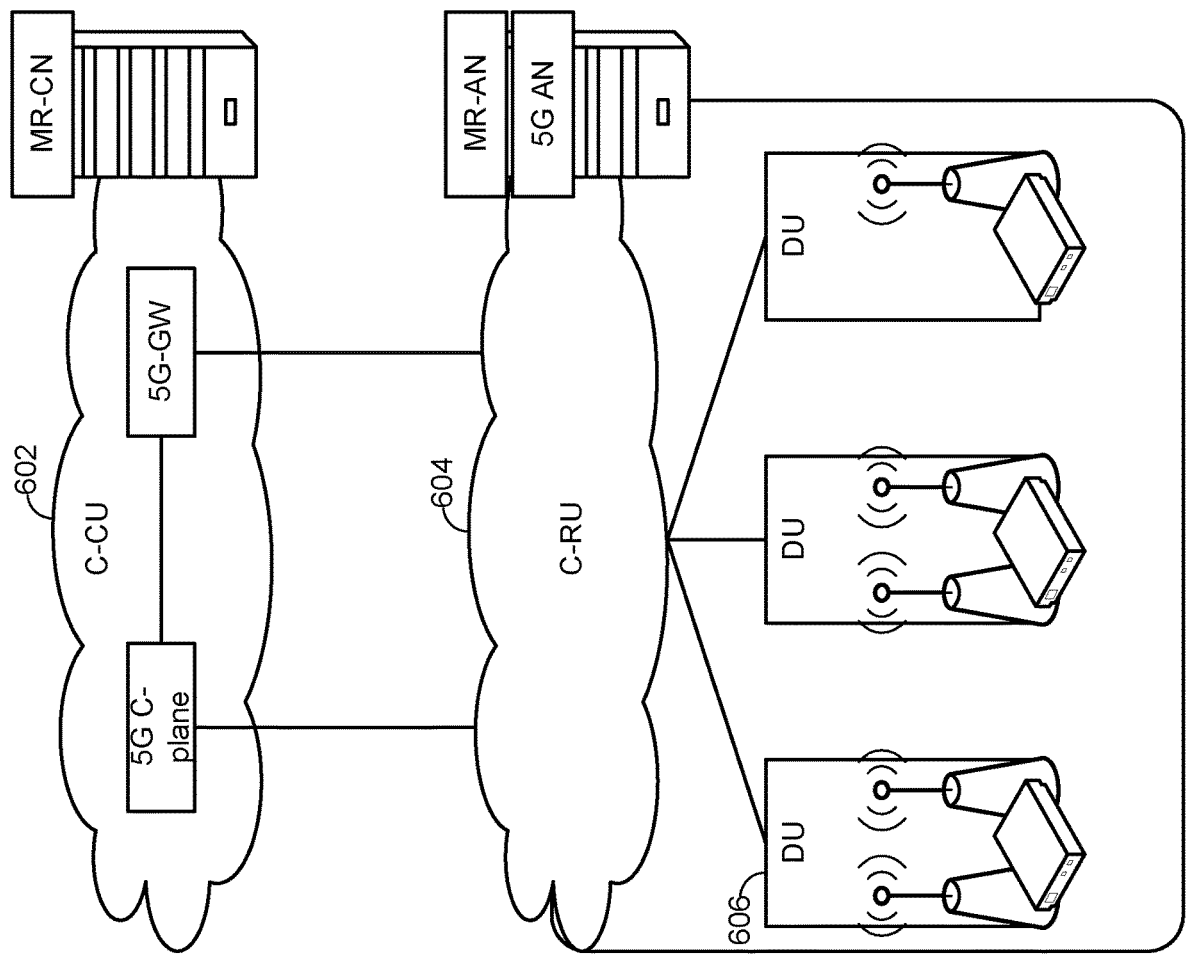
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A UE (e.g., UE 120) may share uplink and/or downlink resources between two or more RATs. For example, the UE may share the uplink and/or downlink resources between a first RAT (e.g., a 4G or LTE RAT) and a second RAT (e.g., a 5G or NR RAT). For example, the LTE RAT may be associated with an LTE primary cell (PCell). The LTE PCell may be associated with a TDD configuration or an FDD configuration. In these cases, a TDM approach may be used for the 4G RAT and the 5G RAT to improve wireless communication performance. Communications using the two or more RATs may be scheduled using a dynamic approach (e.g., wherein any resource can be scheduled for a communication using the 4G RAT or the 5G RAT) or a semi-static approach (e.g., wherein particular resources are guaranteed or designated for the 4G RAT or the 5G RAT).

However, a purely semi-static approach may restrict flexibility of the communications, particularly in 5G, and a purely dynamic approach may waste some resources. For example, assume that a UE needs to transmit an acknowledgment or a periodic communication in a particular subframe. In that case, a preceding downlink subframe that must carry a grant for the acknowledgment or the periodic communication cannot carry downlink data other than the grant. This may cause problems in the dynamic scheduling case.

Some techniques and apparatuses described herein use a semi-static scheduling approach for 4G and a semi-static or dynamic approach for 5G. For example, 4G communications may be associated with one or more guaranteed resources based at least in part on a reference TDD configuration, thereby reducing a likelihood of conflict between the 4G communications and 5G grants or communications. In some aspects, 5G communications may use a semi-static approach, which may improve availability of downlink resources even when not all uplink resources are available. In some aspects, 5G communications may use a dynamic approach, which may provide for more flexible adaptation to different traffic conditions. In this way, communications for a shared uplink or downlink UE may be performed using a semi-static approach for a first RAT (e.g., 4G or LTE) and a semi-static or dynamic approach for a second RAT (e.g., 5G or NR), which improves flexibility of the shared uplink or downlink UE and reduces collisions between traffic of the first RAT and traffic of the second RAT.

In some aspects, the term "4G" may be used interchangeably with "LTE." In some aspects, the term "5G" may be used interchangeably with "NR." Furthermore, while the techniques and apparatuses described herein are primarily described in the context of 4G RATs and 5G RATs, the techniques and apparatuses described herein are not so limited. Indeed, the techniques and apparatuses described herein may be applied for any combination of a first RAT and a second RAT (e.g., a first type of RAT and a second type of RAT). 4G/LTE is provided merely as an example of a first RAT, and 5G/NR is provided merely as an example of a second RAT.

Figure 9A:
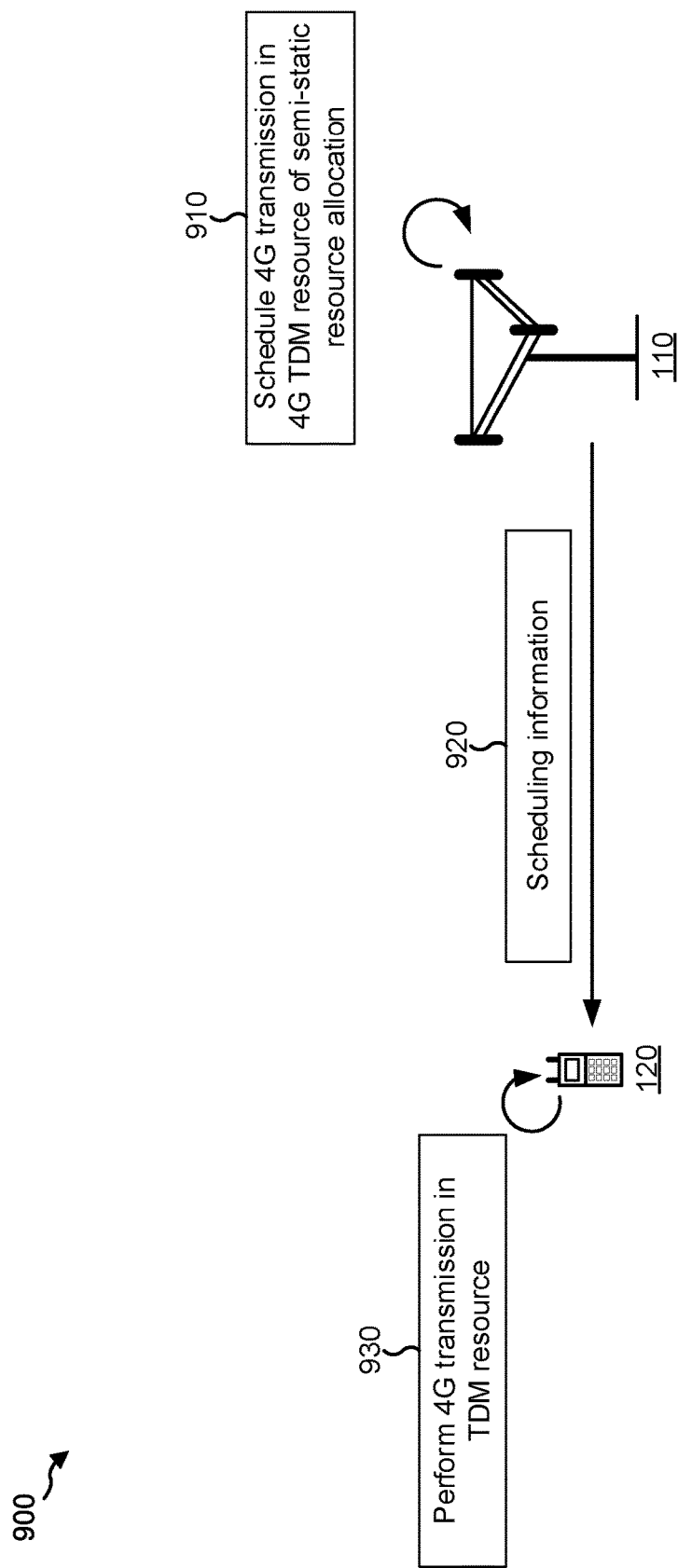
FIGS. 9A and 9B are diagrams illustrating examples of time division multiplexing for dual-RAT communication, in accordance with various aspects of the present disclosure.
Figure 9B:
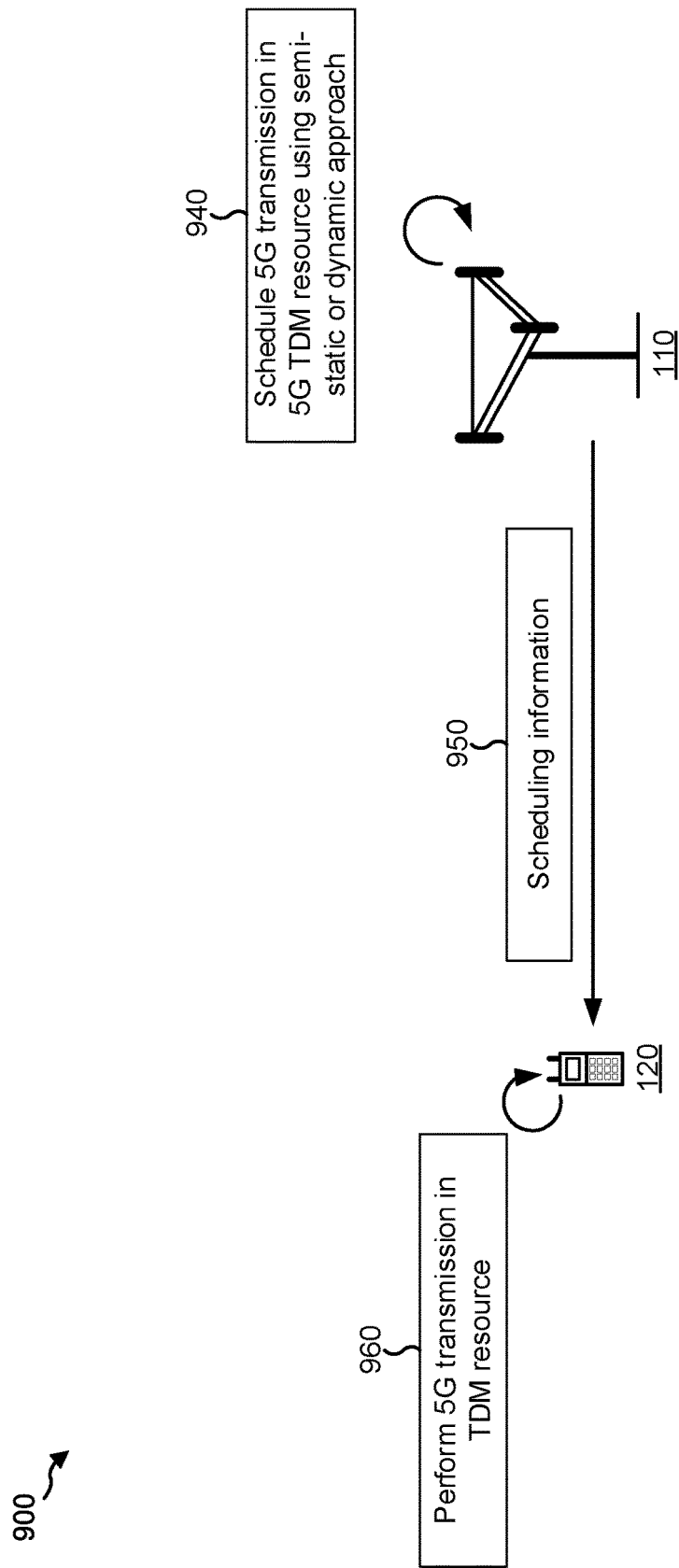

FIGS. 9A and 9B are diagrams illustrating examples 900 of time division multiplexing for dual-RAT communication, in accordance with various aspects of the present disclosure. FIGS. 9A and 9B describe allocation of TDM resources for a communication associated with a 4G RAT or a 5G RAT, though any combination of a first RAT and a second RAT is contemplated. In some aspects, the communication may be a transmission, such as an uplink transmission of the UE 120. For the purpose of FIGS. 9A and 9B, the UE 120 is configured to perform a dual-RAT communication technique with regard to the 4G RAT and the 5G RAT. For example, the UE 120 may be configured to perform uplink sharing with regard to the 4G RAT and the 5G RAT. In such a case, resources (e.g., uplink resources) of the UE 120 may be divided between the 4G RAT and the 5G RAT based at least in part on a TDM approach, as described in more detail below.

As shown in FIG. 9A, and by reference number 910, a BS 110 may schedule a 4G transmission for a UE 120. For example, the 4G transmission may be an uplink data transmission, an uplink data retransmission (e.g., for uplink HARQ), an acknowledgment or negative acknowledgment (e.g., for downlink HARQ), and/or the like. As further shown, the BS 110 may schedule the 4G transmission using a TDM resource of a semi-static resource allocation. In some aspects, the BS 110 may identify the TDM resource based at least in part on a reference TDD configuration. For example, the 4G RAT (and, in some cases, the 5G RAT) may be associated with a reference TDD configuration. The reference TDD configuration may identify a minimum resource allocation that is guaranteed for the 4G RAT. For example, the reference TDD configuration may identify a number of uplink subframes and/or particular uplink subframes that are guaranteed for the 4G RAT. In some aspects, a number of uplink subframes scheduled for the 4G RAT may be greater than the number of uplink subframes that are guaranteed for the 4G RAT.

In some aspects, the 4G RAT may be associated with a FDD configuration. In such a case, the reference TDD configuration may be used to select the TDM resource. In some aspects, the 4G RAT (or a 4G cell associated with the 4G RAT, such as an LTE PCell) may be associated with a TDD configuration. For example, the TDD configuration may identify downlink and uplink resources (e.g., subframes, slots, symbols, and/or the like) for communication on the 4G RAT. In some aspects, the TDD configuration for the 4G RAT may be referred to as a TDD downlink/uplink configuration or a TDD uplink/downlink configuration.

In some aspects, when the 4G transmission is associated with a downlink HARQ communication, the TDM resource may be selected based at least in part on a fixed HARQ timeline (e.g., a legacy LTE HARQ timeline), irrespective of an actual number of uplink subframes allocated for the 4G RAT. For example, the UE 120 may bundle HARQ feedback for the downlink HARQ communication, and may provide bundled HARQ feedback in a resource identified by the fixed HARQ timeline. This may allow all 4G downlink subframes to be usable for the downlink HARQ communication, whereas, if a dynamic HARQ timeline were used, some 4G downlink subframes would be used for scheduling HARQ communications.

In some aspects, when the 4G transmission is associated with a downlink HARQ communication and the 4G RAT is associated with a TDD configuration, the TDM resource for the 4G transmission (e.g., for an acknowledgment (ACK) or a negative acknowledgment (NACK)) may be selected in accordance with the reference TDD configuration. In such a case, downlink data may be provided using any subframe. In some aspects, when the 4G transmission is associated with a downlink HARQ communication and the 4G RAT is associated with a FDD configuration, a resource for the 4G communication (e.g., an ACK or NACK) may be selected in accordance with the reference TDD configuration. In such a case, downlink data may be provided using any resource that is identified by a TDD downlink/uplink configuration as a downlink resource.

In some aspects, when the 4G transmission is associated with an uplink HARQ communication, the TDM resource may not necessarily be selected from resources of the reference TDD configuration. For example, when the 4G RAT is associated with a FDD configuration, the TDM resource for the 4G transmission (e.g., for an uplink data transmission or an uplink data retransmission) may be selected according to a FDD timeline and/or a TDD downlink/uplink configuration. For example, the FDD timeline may be an asynchronous HARQ timeline, a 4 ms+4 ms HARQ timeline, a 4 ms+6 ms HARQ timeline, and/or the like. In such a case, the uplink data may be transmitted on any subframe in accordance with the FDD timeline and the TDD downlink/uplink configuration. In some aspects, the downlink data for the downlink HARQ communication may be received in a resource identified by the TDD downlink/uplink configuration. Additionally, or alternatively, the TDM resource may be selected based at least in part on a flexible approach associated with 5G. In this way, since downlink resources may be always available for uplink grants, any uplink subframe can be used for 4G on a dynamic basis. In some aspects, when the 4G RAT is associated with a TDD configuration (e.g., a TDD downlink/uplink configuration), the TDD configuration may be used to select the TDM resource. For example, the TDM resource may be selected as any resource that is identified as an uplink resource based at least in part on the TDD configuration.

As shown by reference number 920, the BS 110 may transmit the scheduling information to the UE 120, and, as shown by reference number 930, the UE 120 may perform the 4G transmission in the TDM resource. In some aspects, the UE 120 may perform an uplink transmission in the TDM resource. However, the techniques and apparatuses described herein are not necessarily limited to those involving TDM of uplink resources for the UE 120, and may be applied with regard to any communications or resources of the UE 120.

As shown in FIG. 9B, and by reference number 940, the BS 110 may schedule a 5G communication for the UE 120. As further shown, the BS 110 may schedule the 5G communication in a 5G TDM resource based at least in part on a semi-static approach or a dynamic approach.

The semi-static approach may be similar to the semi-static approach described with regard to the 4G RAT in connection with FIG. 9A, above. For example, the UE 120 may be associated with a reference 5G TDD configuration that identifies a guaranteed resource allocation for the 5G RAT, and an actual number of scheduled resources for the 5G RAT may be greater than or equal to the guaranteed resource allocation. In such a case, resources of the reference 5G TDD configuration may not overlap in time with resources of the reference 4G TDD configuration. Additionally, or alternatively, a sum of fixed 5G uplink subframes and fixed 4G uplink subframes may be less than or equal to a total number of uplink subframes of the UE 120.

When using the dynamic approach, the BS 110 may schedule uplink resources for the 5G transmission without using a reference 5G TDD configuration. In other words, the uplink resources may not be guaranteed for the 5G RAT. This may provide increased flexibility for dynamic downlink HARQ and/or dynamic uplink HARQ, and may provide for usage of gaps in 4G communication of the UE 120 for 5G communications. In some aspects, the UE 120 may use a combination of the semi-static approach and the dynamic approach. For example, the UE 120 may use a reference 5G TDD configuration to identify guaranteed resources for 5G, and may selectively schedule resources other than the guaranteed resources for 4G or 5G.

As shown by reference number 950, the BS 110 may transmit the scheduling information to the UE 120, and, as shown by reference number 960, the UE 120 may perform the 5G transmission in the TDM resource. In this way, by using a semi-static approach for 4G and/or 5G TDM, a downlink subframe that would otherwise be used for a grant for a corresponding uplink subframe can be used for another purpose, thereby improving throughput. Furthermore, by using a dynamic approach for 5G TDM, the BS 110 can adapt dynamically with regard to a traffic ratio of 4G traffic to 5G traffic in the uplink.

The operations described in connection with FIGS. 9A and 9B can be performed for 4G and 5G communications in a same frequency band, and can be performed for 4G and 5G communications in different frequency bands.

As indicated above, FIGS. 9A and 9B are provided as examples. Other examples are possible and may differ from what was described with respect to FIGS. 9A and 9B.

Figure 10:
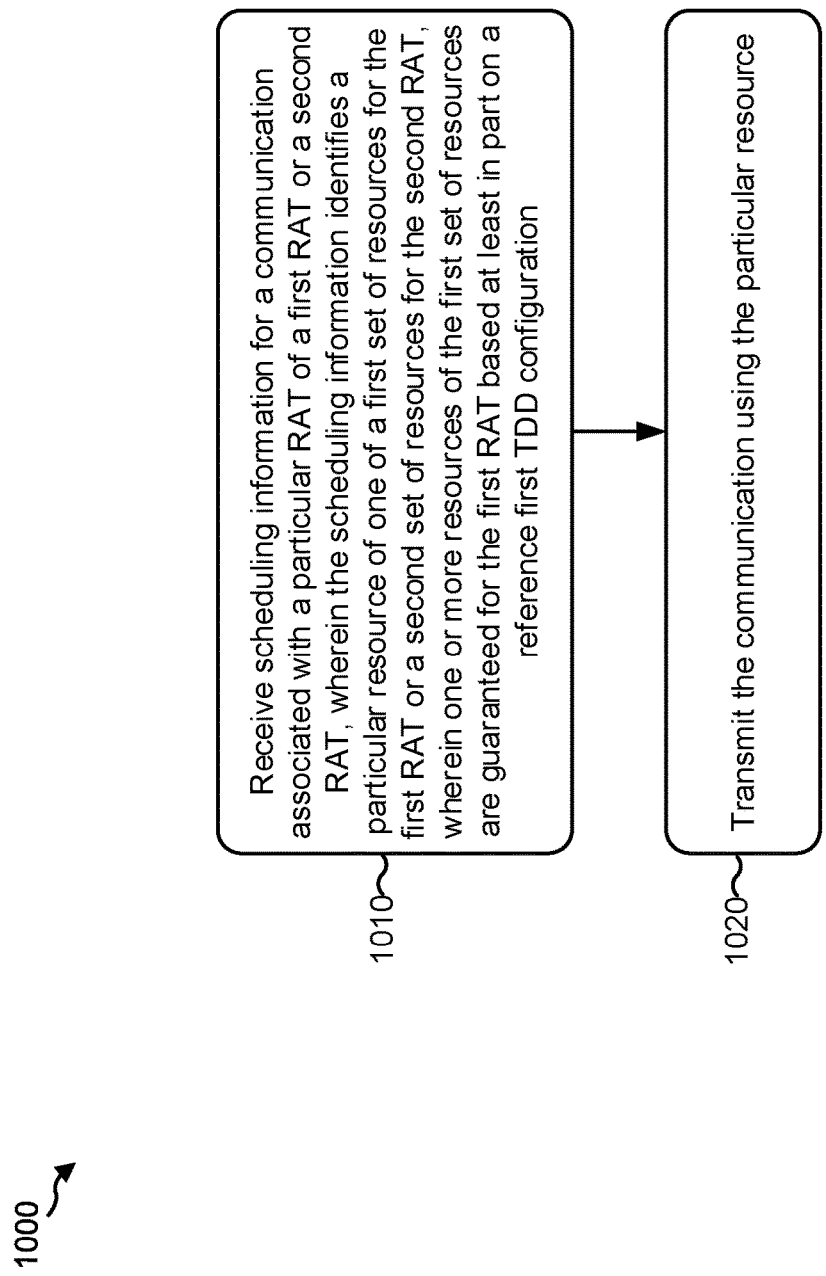
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs time division multiplexing for dual-RAT communication.

As shown in FIG. 10, in some aspects, process 1000 may include receiving scheduling information for a communication associated with a particular RAT of a first RAT or a second RAT, wherein the scheduling information identifies a particular resource of one of a first set of resources for the first RAT or a second set of resources for the second RAT, wherein one or more resources of the first set of resources are guaranteed for the first RAT based at least in part on a reference first TDD configuration of a UE (block 1010). For example, the UE (e.g., using antenna 252, DEMOD 254, MIMO detector 256, receive processor 258, controller/processor 280, and/or the like) may receive scheduling information from a base station (e.g., BS 110). The scheduling information may be for a communication (e.g., an uplink communication) associated with a particular RAT of a first RAT and a second RAT. The scheduling information may identify a particular resource of one of a first set of resources for the first RAT or a second set of resources for the second RAT. One or more resources of the first set of resources may be guaranteed for the first RAT based at least in part on a reference first TDD configuration of the UE. In some aspects, the one or more resources of the first set of resources and the second set of resources do not overlap in a time domain. In some aspects, the first RAT may be a 4G RAT and the second RAT may be a 5G RAT.

As shown in FIG. 10, in some aspects, process 1000 may include transmitting the communication using the particular resource (block 1020). For example, the UE (e.g., using controller/processor 280, transmit processor 264, TX MIMO processor 266, MOD 254, antenna 252, and/or the like) may transmit the communication using the particular resource.

In some aspects, the first set of resources includes the one or more resources of the first set of resources and one or more additional resources. In some aspects, the first RAT is associated with a frequency division duplexing configuration, and the particular resource is based at least in part on the reference first TDD configuration.

In some aspects, the communication is associated with feedback for a downlink hybrid automatic repeat request (HARQ) communication, and the particular resource is based at least in part on the reference first TDD configuration. In some aspects, the UE may receive downlink data of the downlink HARQ communication in any subframe (e.g., any subframe of the first set of resources. In some aspects, the first RAT is associated with a TDD downlink/uplink configuration, and the communication is associated with feedback for a downlink hybrid automatic repeat request (HARQ) communication, and the particular resource is based at least in part on the reference first TDD configuration. In some aspects, the first RAT is associated with a TDD downlink/uplink configuration, and the communication is associated with feedback for a downlink hybrid automatic repeat request (HARQ) communication. The UE may receive downlink data for the downlink HARQ communication in a resource identified by the TDD downlink/uplink configuration.

In some aspects, the particular resource is for an uplink hybrid automatic repeat request (HARQ) payload, and the particular resource is selected based at least in part on a frequency division duplexing timeline for the first RAT. In some aspects, the particular resource is for an uplink hybrid automatic repeat request (HARQ) payload, and the particular resource is selected based at least in part on a TDD downlink/uplink configuration of the first RAT. In some aspects, one or more resources of the second set of resources are guaranteed for the second RAT based at least in part on a reference second TDD configuration of the UE. In some aspects, the one or more resources of the first set of resources and the one or more resources of the second set of resources do not overlap in time. In some aspects, the first set of resources and the second set of resources collectively include more resources than are collectively included in the one or more resources of the first set of resources and the one or more resources of the second set of resources.

In some aspects, the particular resource is of the second set of resources, and the communication is associated with a hybrid automatic repeat request (HARQ) communication; and the particular resource is selected based at least in part on a dynamic HARQ timeline. In some aspects, the one or more resources of the first set of resources are guaranteed for a periodic communication of the UE. In some aspects, the first set of resources is associated with a different frequency than the second set of resources. In some aspects, the first RAT comprises a 4G RAT and the second RAT comprises a 5G RAT Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
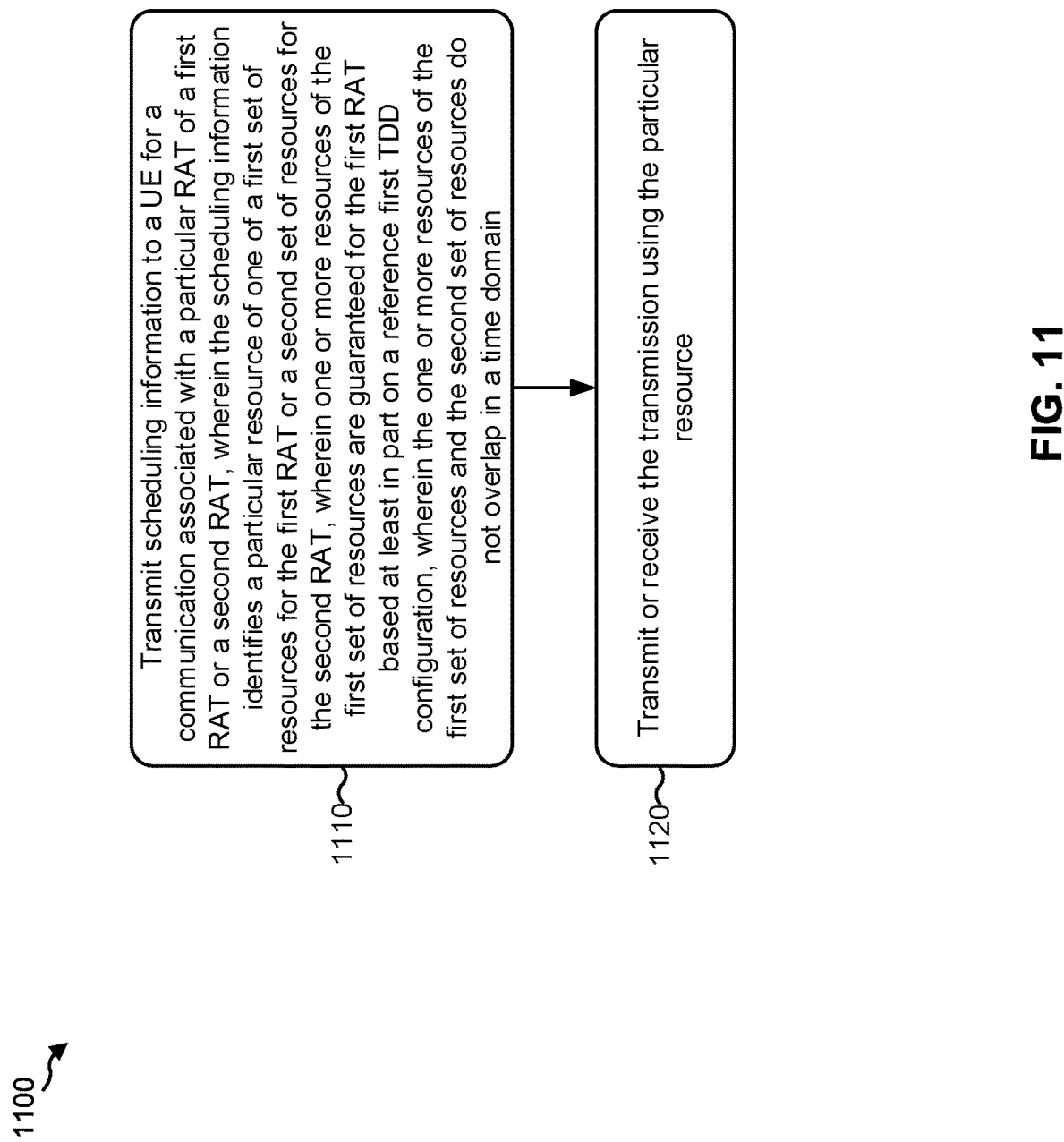
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a base station (e.g., BS 110) performs time division multiplexing for dual-RAT communication.

As shown in FIG. 11, in some aspects, process 1100 may include transmitting scheduling information to a UE for a communication associated with a particular RAT of a first RAT or a second RAT, wherein the scheduling information identifies a particular resource of one of a first set of resources for the first RAT or a second set of resources for the second RAT, wherein one or more resources of the first set of resources are guaranteed for the first RAT based at least in part on a reference first TDD configuration, and wherein the one or more resources of the first set of resources and the second set of resources do not overlap in a time domain (block 1110). For example, the base station (e.g., using controller/processor 240, transmit processor 220, TX MIMO processor 230, MOD 232, antenna 234, and/or the like) may transmit scheduling information. The scheduling information may be for a communication (e.g., an uplink communication, an uplink data communication, an uplink data recommunication, etc.) associated with a particular RAT of a first RAT or a second RAT. The scheduling information may identify a particular resource (e.g., a TDM resource) of one of a first set of resources for the first RAT or a second set of resources for the second RAT. One or more resources of the first set of resources may be guaranteed for the first RAT based at least in part on a reference first TDD configuration of the UE. The one or more resources of the first set of resources may be non-overlapped with the second set of resources in the time domain. In some aspects, the first RAT may be a 4G RAT and the second RAT may be a 5G RAT.

As shown in FIG. 11, in some aspects, process 1100 may include receiving the communication using the particular resource (block 1120). For example, the base station (e.g., using controller/processor 240, transmit processor 220, TX MIMO processor 230, MOD 232, antenna 234, DEMOD 232, MIMO detector 236, receive processor 238, controller/processor 240, and/or the like) may receive the communication using the particular resource.

Process 1100 may include additional aspects, such as any single aspect or any combination of aspects described below and/or in connection with one or more other processes described elsewhere herein.

In some aspects, the first set of resources includes the one or more resources of the first set of resources and one or more additional resources. In some aspects, the first RAT is associated with a frequency division duplexing configuration, and the particular resource is based at least in part on the reference first TDD configuration. In some aspects, the communication is associated with feedback for a downlink hybrid automatic repeat request (HARQ) communication, and the particular resource is based at least in part on the reference first TDD configuration.

In some aspects, the base station may transmit downlink data of the downlink HARQ communication in any subframe (e.g., any subframe of the first set of subframes). In some aspects, the first RAT is associated with a TDD downlink/uplink configuration, and the communication is associated with feedback for a downlink hybrid automatic repeat request (HARQ) communication, and the particular resource is based at least in part on the reference first TDD configuration.

In some aspects, the first RAT is associated with a TDD downlink/uplink configuration, and the communication is associated with feedback for a downlink hybrid automatic repeat request (HARQ) communication. The base station may transmit downlink data for the downlink HARQ communication in a resource identified by the TDD downlink/uplink configuration. In some aspects, the particular resource is for an uplink hybrid automatic repeat request (HARQ) payload, and the particular resource is selected based at least in part on a frequency division duplexing timeline for the first RAT.

In some aspects, the particular resource is for an uplink hybrid automatic repeat request (HARQ) payload, and the particular resource is selected based at least in part on a TDD downlink/uplink configuration of the first RAT. In some aspects, one or more resources of the second set of resources are guaranteed for the second RAT based at least in part on a reference second TDD configuration of the UE. In some aspects, the one or more resources of the first set of resources and the one or more resources of the second set of resources do not overlap in time. In some aspects, the first set of resources and the second set of resources collectively include more resources than are collectively included in the one or more resources of the first set of resources and the one or more resources of the second set of resources.

In some aspects, the particular resource is of the second set of resources, and the communication is associated with a hybrid automatic repeat request (HARQ) communication; and the particular resource is selected based at least in part on a dynamic HARQ timeline. In some aspects, the one or more resources of the first set of resources are guaranteed for a periodic communication of the UE. In some aspects, the first set of resources is associated with a different frequency than the second set of resources. In some aspects, the first RAT comprises a 4G RAT and the second RAT comprises a 5G RAT.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE) configured for uplink sharing for a first radio access technology (RAT) and a second RAT, comprising:

receiving scheduling information for a communication associated with a particular RAT of the first RAT or the second RAT, wherein, when the particular RAT is the first RAT:
the scheduling information identifies a first particular resource of a first set of resources, and
the first particular resource is selected based at least in part on a semi-static approach and a 4 ms+6 ms hybrid automatic repeat request (HARQ) timeline,
wherein, when the particular RAT is the second RAT:
the scheduling information identifies a second particular resource of a second set of resources, and
the second particular resource is selected using a dynamic approach,
wherein one or more resources of the first set of resources are guaranteed for the first RAT based at least in part on a reference first time division duplexing (TDD) configuration, and
wherein the one or more resources of the first set of resources and the second set of resources do not overlap in a time domain; and
transmitting the communication using the first particular resource or the second particular resource.

2. The method of claim 1, wherein the first set of resources includes the one or more resources of the first set of resources and one or more additional resources.

3. The method of claim 1, wherein the first RAT is associated with a frequency division duplexing configuration, and wherein the first particular resource is based at least in part on the reference first TDD configuration.

4. The method of claim 1, wherein the communication is associated with feedback for a downlink HARQ communication, and wherein the first particular resource is based at least in part on the reference first TDD configuration.

5. The method of claim 4, further comprising:
receiving downlink data of the downlink HARQ communication in any subframe.

6. The method of claim 1, wherein the first RAT is associated with a TDD downlink/uplink configuration, wherein the communication is associated with feedback for a downlink HARQ communication, and wherein the first particular resource is based at least in part on the reference first TDD configuration.

7. The method of claim 1, wherein the first RAT is associated with a TDD downlink/uplink configuration, wherein the communication is associated with feedback for a downlink HARQ communication, and wherein the method further comprises:
receiving downlink data for the downlink HARQ communication in a resource identified by the TDD downlink/uplink configuration.

8. The method of claim 1, wherein the first particular resource is for an uplink HARQ payload, and wherein the first particular resource is selected based at least in part on a frequency division duplexing timeline for the first RAT.

9. The method of claim 1, wherein the first particular resource is for an uplink HARQ payload, and wherein the first particular resource is selected based at least in part on a TDD downlink/uplink configuration of the first RAT.

10. The method of claim 1, wherein one or more resources of the second set of resources are guaranteed for the second RAT based at least in part on a reference second TDD configuration of the UE.

11. The method of claim 1, wherein the one or more resources include time division multiplexing (TDM) resources.

12. The method of claim 10, wherein the first set of resources and the second set of resources collectively include more resources than are collectively included in the one or more resources of the first set of resources and the one or more resources of the second set of resources.

13. The method of claim 1, wherein the communication is associated with a HARQ communication; and
wherein the second particular resource is selected based at least in part on a dynamic HARQ timeline.

14. The method of claim 1, wherein the one or more resources of the first set of resources are guaranteed for a periodic communication of the UE.

15. The method of claim 1, wherein the first set of resources is associated with a different frequency than the second set of resources.

16. The method of claim 1, wherein the first RAT comprises a 4G RAT and the second RAT comprises a 5G RAT.

17. A method of wireless communication performed by a base station, comprising:
transmitting scheduling information to a user equipment (UE) for a communication associated with a particular radio access technology (RAT) of a first RAT or a second RAT,
wherein, when the particular RAT is the first RAT:
the scheduling information identifies a first particular resource of a first set of resources, and
the first particular resource is selected based at least in part on a semi-static approach and a 4 ms+6 ms hybrid automatic repeat request (HARD) timeline for the first RAT,
wherein, when the particular RAT is the second RAT:
the scheduling information identifies a second particular resource of a second set of resources, and
the second particular resource is selected using a dynamic approach,
wherein one or more resources of the first set of resources are guaranteed for the first RAT based at least in part on a reference first time division duplexing (TDD) configuration, and
wherein the one or more resources of the first set of resources and the second set of resources do not overlap in a time domain; and
receiving the communication using the first particular resource or the second particular resource.

18. The method of claim 17, wherein the first set of resources includes the one or more resources of the first set of resources and one or more additional resources.

19. The method of claim 17, wherein the first RAT is associated with a frequency division duplexing configuration, and wherein the first particular resource is based at least in part on the reference first TDD configuration.

20. The method of claim 17, wherein the communication is associated with feedback for a downlink HARQ communication, and wherein the first particular resource is based at least in part on the reference first TDD configuration.

21. The method of claim 20, further comprising:
transmitting downlink data of the downlink HARQ communication in any subframe.

22. The method of claim 17, wherein the first RAT is associated with a TDD downlink/uplink configuration, wherein the communication is associated with feedback for a downlink HARQ communication, and wherein the first particular resource is based at least in part on the reference first TDD configuration.

23. The method of claim 17, wherein the first RAT is associated with a TDD downlink/uplink configuration, wherein the communication is associated with feedback for a downlink HARQ communication, and wherein the method further comprises:

transmitting downlink data for the downlink HARQ communication in a resource identified by the TDD downlink/uplink configuration.

24. The method of claim 17, wherein the first particular resource is for an uplink HARQ payload, and wherein the first particular resource is selected based at least in part on a frequency division duplexing timeline for the first RAT.

25. The method of claim 17, wherein the first particular resource is for an uplink HARQ payload, and wherein the first particular resource is selected based at least in part on a TDD downlink/uplink configuration of the first RAT.

26. The method of claim 17, wherein one or more resources of the second set of resources are guaranteed for the second RAT based at least in part on a reference second TDD configuration of the UE.

27. The method of claim 17, wherein the one or more resources include time division multiplexing (TDM) resources.

28. The method of claim 27, wherein the first set of resources and the second set of resources collectively include more resources than are collectively included in the one or more resources of the first set of resources and the one or more resources of the second set of resources.

29. The method of claim 17, wherein the communication is associated with a HARQ communication; and
wherein the second particular resource is selected based at least in part on a dynamic HARQ timeline.

30. The method of claim 17, wherein the one or more resources of the first set of resources are guaranteed for a periodic communication of the UE.

31. The method of claim 17, wherein the first set of resources is associated with a different frequency than the second set of resources.

32. The method of claim 17, wherein the first RAT comprises a 4G RAT and the second RAT comprises a 5G RAT.

33. A user equipment (UE) for wireless communication, configured for uplink sharing for a first radio access technology (RAT) and a second RAT, comprising:
a memory; and
one or more processors operatively coupled to the memory, the memory and the one or more processors configured to:
receive scheduling information for a communication associated with a particular RAT of the first RAT or the second RAT,
wherein, when the particular RAT is the first RAT:
the scheduling information identifies a first particular resource of a first set of resources, and
the first particular resource is selected based at least in part on a semi-static approach and a 4 ms+6 ms hybrid automatic repeat request (HARD) timeline,
wherein, when the particular RAT is the second RAT:
the scheduling information identifies a second particular resource of a second set of resources, and
the second particular resource is selected using a dynamic approach,
wherein one or more resources of the first set of resources are guaranteed for the first RAT based at least in part on a reference first TDD configuration of the UE, and
wherein the one or more resources of the first set of resources and the second set of resources do not overlap in a time domain; and
transmit the communication using the first particular resource or the second particular resource.

34. The UE of claim 33, wherein the first set of resources includes the one or more resources of the first set of resources and one or more additional resources.

35. The UE of claim 33, wherein the first RAT is associated with a frequency division duplexing configuration, and wherein the first particular resource is based at least in part on the reference first TDD configuration.

36. The UE of claim 33, wherein the communication is associated with feedback for a downlink HARQ communication, and wherein the first particular resource is based at least in part on the reference first TDD configuration.

37. The UE of claim 36, wherein the one or more processors are to:
receive downlink data of the downlink HARQ communication in any subframe.

38. The UE of claim 33, wherein the first RAT is associated with a TDD downlink/uplink configuration, wherein the communication is associated with feedback for a downlink HARQ communication, and wherein the first particular resource is based at least in part on the reference first TDD configuration.

39. The UE of claim 33, wherein the first RAT is associated with a TDD downlink/uplink configuration, wherein the communication is associated with feedback for a downlink HARQ communication, and wherein the one or more processors are to:
receive downlink data for the downlink HARQ communication in a resource identified by the TDD downlink/uplink configuration.

40. The UE of claim 33, wherein the first particular resource is for an uplink HARQ payload, and wherein the first particular resource is selected based at least in part on a frequency division duplexing timeline for the first RAT.

41. The UE of claim 33, wherein the first particular resource is for an uplink HARQ payload, and wherein the first particular resource is selected based at least in part on a TDD downlink/uplink configuration of the first RAT.

42. The UE of claim 33, wherein one or more resources of the second set of resources are guaranteed for the second RAT based at least in part on a reference second TDD configuration of the UE.

43. The UE of claim 33, wherein the one or more resources include time division multiplexing (TDM) resources.

44. The UE of claim 42, wherein the first set of resources and the second set of resources collectively include more resources than are collectively included in the one or more resources of the first set of resources and the one or more resources of the second set of resources.

45. The UE of claim 33, wherein the communication is associated with a HARQ communication; and
wherein the second particular resource is selected based at least in part on a dynamic HARQ timeline.

46. The UE of claim 33, wherein the one or more resources of the first set of resources are guaranteed for a periodic communication of the UE.

47. The UE of claim 33, wherein the first set of resources is associated with a different frequency than the second set of resources.

48. The UE of claim 33, wherein the first RAT comprises a 4G RAT and the second RAT comprises a 5G RAT.

49. A base station for wireless communication, comprising:
a memory; and
one or more processors operatively coupled to the memory, the memory and the one or more processors configured to:

transmit scheduling information to a user equipment (UE) for a communication associated with a particular radio access technology (RAT) of a first RAT or a second RAT,
  wherein, when the particular RAT is the first RAT:
    the scheduling information identifies a first particular resource of a first set of resources for the first RAT,
    the first particular resource is selected based at least in part on a semi-static approach and a 4 ms+6 ms hybrid automatic repeat request (HARD) timeline,
  wherein, when the particular RAT is the second RAT:
    the scheduling information identifies a second particular resource of a second set of resources, and
    the second particular resource is selected using a dynamic approach,
  wherein one or more resources of the first set of resources are guaranteed for the first RAT based at least in part on a reference first time division duplexing (TDD) configuration, and
  wherein the one or more resources of the first set of resources and the second set of resources do not overlap in a time domain; and
  receive the communication using the first particular resource or the second particular resource.

50. The base station of claim 49, wherein the first set of resources includes the one or more resources of the first set of resources and one or more additional resources.

51. The base station of claim 49, wherein the first RAT is associated with a frequency division duplexing configuration, and wherein the first particular resource is based at least in part on the reference first TDD configuration.

52. The base station of claim 49, wherein the communication is associated with feedback for a downlink HARQ communication, and wherein the first particular resource is based at least in part on the reference first TDD configuration.

53. The base station of claim 52, wherein the one or more processors are to:
  transmit downlink data of the downlink HARQ communication in any subframe.

54. The base station of claim 49, wherein the first RAT is associated with a TDD downlink/uplink configuration, wherein the communication is associated with feedback for a downlink HARQ communication, and wherein the first particular resource is based at least in part on the reference first TDD configuration.

55. The base station of claim 49, wherein the first RAT is associated with a TDD downlink/uplink configuration, wherein the communication is associated with feedback for a downlink HARQ communication, and wherein the one or more processors are further to:
  transmit downlink data for the downlink HARQ communication in a resource identified by the TDD downlink/uplink configuration.

56. The base station of claim 49, wherein the first particular resource is for an uplink HARQ payload, and wherein the first particular resource is selected based at least in part on a frequency division duplexing timeline for the first RAT.

57. The base station of claim 49, wherein the first particular resource is for an uplink HARQ payload, and wherein the first particular resource is selected based at least in part on a TDD downlink/uplink configuration of the first RAT.

58. The base station of claim 49, wherein one or more resources of the second set of resources are guaranteed for the second RAT based at least in part on a reference second TDD configuration of the UE.

59. The base station of claim 49, wherein the one or more resources include time division multiplexing (TDM) resources.

60. The base station of claim 59, wherein the first set of resources and the second set of resources collectively include more resources than are collectively included in the one or more resources of the first set of resources and the one or more resources of the second set of resources.

61. The base station of claim 49, wherein the communication is associated with a HARQ communication; and
  wherein the second particular resource is selected based at least in part on a dynamic HARQ timeline.

62. The base station of claim 49, wherein the one or more resources of the first set of resources are guaranteed for a periodic communication of the UE.

63. The base station of claim 49, wherein the first set of resources is associated with a different frequency than the second set of resources.

64. The base station of claim 49, wherein the first RAT comprises a 4G RAT and the second RAT comprises a 5G RAT.

* * * * *